No. 732,079. PATENTED JUNE 30, 1903.
C. W. HUNT.
POWER TRANSMITTING DEVICE.
APPLICATION FILED OCT. 29, 1902.
NO MODEL.

Attest:
A. N. Jesbera.
L. E. Varney.

Inventor:
Charles Wallace Hunt
by Redding, Kiddle & Greeley
Attys.

No. 732,079. Patented June 30, 1903.

UNITED STATES PATENT OFFICE.

CHARLES W. HUNT, OF WEST NEW BRIGHTON, NEW YORK.

POWER-TRANSMITTING DEVICE.

SPECIFICATION forming part of Letters Patent No. 732,079, dated June 30, 1903.

Application filed October 29, 1902. Serial No. 129,198. (No model.)

*To all whom it may concern:*

Be it known that I, CHARLES WALLACE HUNT, a citizen of the United States, residing in West New Brighton, borough of Richmond, city of New York, State of New York, have invented certain new and useful Improvements in Power-Transmitting Devices, of which the following is a specification, reference being had to the accompanying drawings, forming a part hereof.

This invention relates to power-transmitting devices or couplings by which power is transmitted from one rotating part to another; and it has for its object to provide an improved device or coupling of this character which shall not require the two rotating parts to be in exact axial alinement. The coupling which has been devised and will be hereinafter more particularly explained not only serves this chief purpose, but it acts as a cushion between the two rotating parts, taking up shocks and insuring the smooth running of the driven part.

Figure 1:
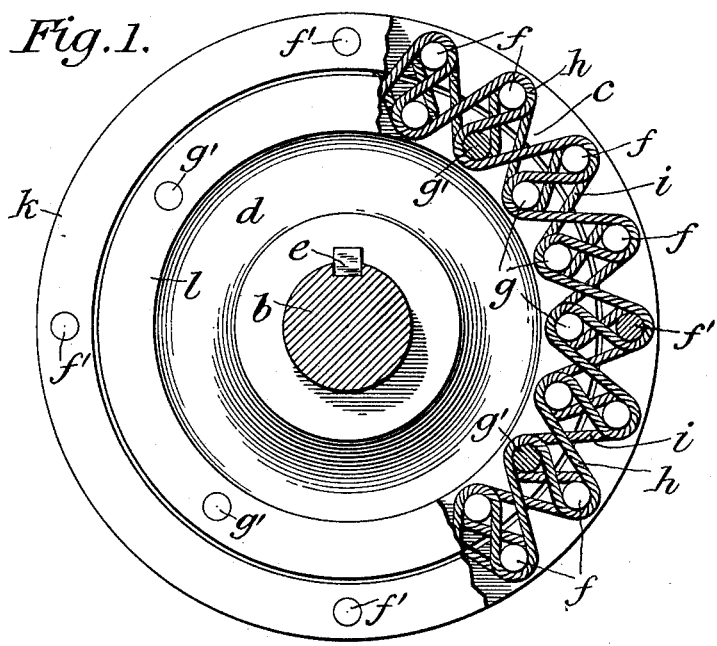
Figure 2:
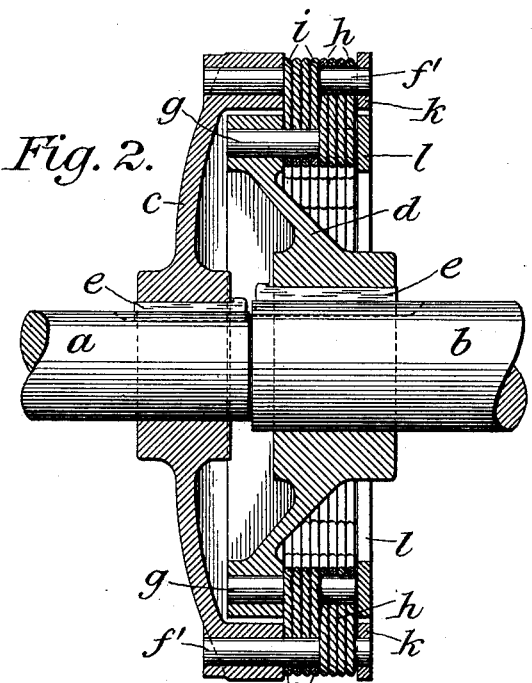

In the accompanying drawings, in which is represented a desirable embodiment of the invention, Figure 1 is a side view of the improved device, the guard-plates being broken away and the supporting-pins therefor being shown in section. Fig. 2 is a longitudinal sectional view of the same, the two shafts being shown in elevation.

The device comprises two members concentric, respectively, with the rotating parts to be coupled, one of said members preferably surrounding or inclosing the other of said members, and a flexible connector between said members, said flexible connector extending from one of said members to the other near the peripheries of said members and being preferably of such a character as to permit one of said members to rotate somewhat eccentrically with respect to the other of said members without causing any binding either of the driver or of the driven part in its bearings. Obviously the two members and the connection between the same can be arranged in various ways to accomplish the desired result.

In the embodiment of the invention, which for purposes of illustration and explanation is represented in the drawings, the two rotating parts, shown as shafts $a$ and $b$, which may be somewhat out of axial alinement, receive near their ends, respectively, the two concentric members of the coupling. Each member may consist of a disk $c$ and $d$, respectively, suitably secured to its shaft, as by a key $e$, and suitably flanged or dished, and in each, near the periphery thereof, a circumferential series of pins $f$ and $g$, respectively, the pins in both series being projected outwardly in the same direction. The disk or carrier portion of one member, as $c$, is of a greater diameter than the corresponding portion $d$ of the other member, and both are suitably dished or otherwise formed, so that the corresponding faces shall be substantially in the same plane, while the series of pins $f$ shall inclose or surround the series of pins $g$. Sufficient clearance between the two parts $c$ and $d$ is provided to permit of the eccentricity of the one part with respect to the other without contact between the two during rotation. The two members are coupled by a flexible connector, shown as a rope, which is passed about the successive pins of the two series in alternation and which on account of the particular disposition with respect to each other of the two clutch members and the pins thereon is easily and conveniently wound upon the pins in the manner just referred to and may be readily inspected at any time. If the two members rotate always in the same direction, as contrary clockwise, the flexible connector, shown as a rope $h$, may be passed about the pins in one direction only, the direction being such that the one part shall drag the other; but if a reversal of rotation is possible from time to time then in order to prevent the lost motion which would follow in changing the direction of draft of the connector the same or a second rope, as $i$, is passed about the pins in alternation in the opposite direction. By this arrangement one rope or the other is in position to give the proper draft without any lost motion when the direction of rotation is reversed. The rope is passed about the pins in each direction one or more times, according to the power to be transmitted through the device. To avoid accident, the free ends of each series of pins may be capped by an annular guard-plate $k$ and $l$, respectively, each guard-plate being supported by certain of the corresponding series of pins, as $f'$ and $g'$, which are slightly longer than others of the series.

As will now be readily understood, the provision of the flexible connector between the rotating members not only permits some axial disalinement of the two members without affecting the movement of either, but it provides between the two parts a cushion which takes up shocks, compensates for irregularities in the teeth of the gearing, for example, and insures the smooth running of the driven part.

I claim as my invention—

1. A power-transmitting device, comprising two rotating members independently supported, a series of pins carried by each of said members upon the faces thereof, the two series of pins standing in substantially the same transverse plane and projected in the same direction, one series surrounding the other series, and a flexible connector passed about the pins of the two series in alternation.

2. A power-transmitting device, comprising two rotating members independently supported, each of said members consisting of a flanged disk and a series of pins secured therein near the face thereof, one series of pins surrounding the other series, the pins in both series projecting outwardly in the same direction and a rope passed about the pins of the two series in alternation.

3. A power-transmitting device, comprising two rotating members independently supported, a series of pins carried by each of said members upon the faces thereof, the two series of pins standing in substantially the same transverse plane, one series surrounding the other series, and two flexible connectors one of which is passed about the pins of the two series in alternation in one direction, and the other of which is passed about the pins of the two series in alternation in the opposite direction.

This specification signed and witnessed this 25th day of October, A. D. 1902.

CHARLES W. HUNT.

In presence of—
ANTHONY N. JESBERA,
M. A. BRAYLEY.